United States Patent [19]
Fast et al.

[11] Patent Number: 5,213,711
[45] Date of Patent: May 25, 1993

[54] FLUORESCENT COATING

[75] Inventors: Peder Fast, Kullavik; Lars A. Bergkvist, Själevad, both of Sweden

[73] Assignee: Ultralux AB, Göteborg, Sweden

[21] Appl. No.: 725,803

[22] Filed: Jul. 9, 1991

[30] Foreign Application Priority Data

Jul. 11, 1990 [SE] Sweden .............................. 9002413

[51] Int. Cl.⁵ .............................................. C09K 11/02
[52] U.S. Cl. .......................... 252/301.35; 252/301.36
[58] Field of Search ........................ 252/301.36, 301.35

[56] References Cited

U.S. PATENT DOCUMENTS

| | | | |
|---|---|---|---|
| 3,105,954 | 10/1963 | Gill | 252/301.36 |
| 3,592,777 | 7/1971 | Bayer | 252/301.35 |
| 3,701,740 | 10/1972 | Crivello | 252/301.35 |
| 3,830,682 | 8/1974 | Rowland | 359/530 |
| 4,040,760 | 8/1977 | Wyckoff | 359/551 |
| 4,208,300 | 6/1980 | Gravisse | 252/301.36 |

Primary Examiner—Jacqueline V. Howard
Attorney, Agent, or Firm—Nies, Kurz, Bergert & Tamburro

[57] ABSTRACT

A fluorescing coating which fluoresces when illuminated with light within the ultraviolet wavelength range. The coating is intended primarily for road markings of different kinds and includes material (4;5) with pigment for emitting color when illuminated with light within the visible wavelength range and material which fluoresces when illuminated with light within the ultraviolet wavelength range. The coating further includes a binder (3). The invention is characterized in that the material which fluoresces when illuminated with light within the ultraviolet wavelength range consists of glass spheres (2) or glass pieces produced from a glass mass which has been doped with a dope additive such as to cause the glass in the glass spheres or glass pieces to fluoresce when illuminated with ultraviolet light.

12 Claims, 1 Drawing Sheet

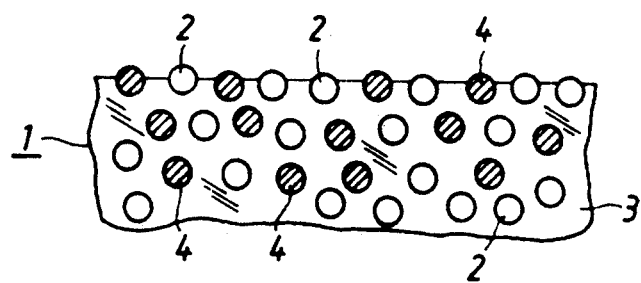
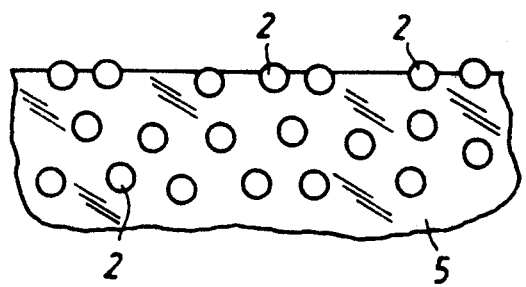

FLUORESCENT COATING

The present invention relates to a fluorescent coating which fluoresces when excited by light within the ultraviolet wavelength range.

BACKGROUND OF THE INVENTION

More particularly, the invention relates to a coating intended for road markings, for instance such markings as road center and road verge lines, stop lines, markings which indicate roads that have right-of-way, and pedestrain crossing markings, etc.. The coating can also be used for different types of road signs for instance.

It is a well known problem that although the full beam of a motor vehicle will illuminate satisfactorily the surroundings ahead of the vehicle, it will, at the same time, dazzle the drivers of oncoming vehicles. Although dipped headlights will not dazzle the drivers of oncoming vehicles, the surroundings ahead of the vehicle are not illuminated to a satisfactory extent. The light provided by dipped headlights, however, is normally sufficient to enable the driver of a vehicle to see the road ahead.

However, the ability of a driver to discern road markings and other permanent markings, and also pedestrians, is greatly impaired when driving on dipped headlights, as compared with driving on full beam.

There is a desire, which is becoming more and more pronounced, to equip vehicles with lamps which emit ultraviolet light. Such light causes a number of different pigments to fluoresce to a larger or lesser degree. In recent times, it has become progressively more usual to use so-called daylight pigments or paints, i.e. colours which when excited by ultraviolet light (UV) emit light in the visible wavelength. Light coloured clothing will also fluoresce relatively well when illuminated with ultraviolet light.

In addition to the ability of a vehicle to emit ultraviolet light, it should be possible, with the intention of enhancing safety in traffic, to paint verge posts along the roads, road signs, etc., totally or partially in so-called daylight colours to a greater extent than has hitherto been the case.

It is known to produce road markings which fluoresce when illuminated with ultraviolet light. One such coating is known from U.S. Pat. No. 3,253,146. This coating comprises pigment which fluoresces when illuminated with ultraviolet light admixed with a transparent carrier or matrix.

The known technique in which ultraviolet-fluorescing paints, so-called daylight paints, are used generally requires the use of pigment which will fluoresce when illuminated with ultraviolet light.

One serious drawback with the use of such pigments is that they age relatively quickly.

Swedish Patent Specification No. 8802996-2 (having a corresponding co-pending U.S. application Ser. No. 684,152 with a Swedish priority date of Aug. 26, 1988) teaches a method of producing a so-called road dressing, i.e. a wear layer on roads, said dressing containing mineral which has been doped with dope additives such that the mineral will fluoresce when illuminated with ultraviolet light. This mineral is incorporated in an otherwise dark road surface coating. Despite the large surface area of the road coating, the road surface will fluoresce sufficiently when a vehicle equipped with ultraviolet lamps illuminates the road surface.

One problem with road markings which are intended to fluoresce when illuminated with ultraviolet light is that the markings shall be readily visible when illuminated with natural daylight and when illuminated with artificial light within the visible wavelength range while at the same time producing sufficient fluorescence when illuminated with ultraviolet light, despite the relatively small surface area of the markings. Another problem is one of producing weather durable road markings whose fluorescence properties will remain unimpaired over long periods of time.

SUMMARY OF THE INVENTION

These problems are solved by means of the present invention, which provides a coating which is readily visible both when illuminated with visible light and with ultraviolet light, and which has a long life span.

Accordingly, the present invention relates to a fluorescent coating which fluoresces when illuminated with light within the ultraviolet wavelength range, said coating being intended primarily for different kinds of road markings and comprising material incorporating pigment which will emit colour when illuminated with light within the visible wavelength range, and material which fluoresces when illuminated with light within the ultraviolet wavelength range, together with a binder, and is characterized in that the material which fluoresces when illuminated with light within the ultraviolet wavelength range comprises glass spheres or pieces of glass produced from a glass mass which has been doped with a dope additive such that the glass in the glass spheres or glass pieces will fluoresce when illuminated with ultraviolet light.

By glass is meant in the following and in the claims glass or corresponding mineral material. Thus, other minerals such as glass fibers and mineral fibers are included in the term "glass".

BRIEF DESCRIPTION OF THE DRAWING

The invention will now be described in more detail with reference to exemplifying embodiments of the invention illustrated in the accompanying drawing, in which FIG. 1 is a cross-sectional view of an inventive coating according to a first embodiment; and FIG. 2 is a cross-sectional view of an inventive coating according to a second embodiment.

DESCRIPTION OF THE PREFERRED EMBODIMENTS

FIG. 1 is a surface section of an inventive coating according to a first embodiment of the invention. The coating as a whole is identified in general by the reference numeral 1. The coating fluoresces when excited with light within the ultraviolet wavelength range, which light may be emitted from the lamps of a motor vehicle and/or from permanent fittings on pedestrian crossings for instance. The coating is intended primarily for different kinds of road markings, but can also be used on signs and other objects. The present invention is not restricted to any particular kind of use.

The coating 1 includes colour pigment which will shine with a coloured light when illuminated with light within the visible wavelength range and material which will fluoresce when illuminated with light within the ultraviolet wavelength range, and a binding agent.

According to the invention, the material which fluoresces when illuminated with light within the ultraviolet wavelength range consists of glass spheres or beads 2 or glass pieces produced from a glass mass which has been doped with a dope additive such that the glass in the glass spheres or glass pieces will fluoresce when illuminated with ultraviolet light. These glass spheres are shown as empty circles in FIGS. 1 and 2. The term glass pieces includes all types of crushed or disintegrated glass.

The man skilled in this art will be aware of those substances which shall be added to a glass mass of given chemical composition in order to dope the glass mass so that it will fluoresce when illuminated with ultraviolet light. Those substances with which different glass masses shall be doped in order to produce fluorscence of different colours are also known to the skilled person. For instance, it can be mentioned that standard transparent glass will fluoresce with a yellow colour or a yellow-green colour when the glass has been doped with Uranhexafluoride. The present invention does not pertain to the combination of different glass compositions and dope additives per se for obtaining fluorescence in different colours, and hence this aspect will not be further discussed. By "dope" is meant a process of incorporating in a given glass mass one or more substances which will ensure that the glass mass, subsequent to solidifying, will fluoresce when illuminated with ultraviolet light.

When a doped glass is used it is not the aforesaid pigment which fluoresces when illuminated with ultraviolet light, but instead the actual glass itself. Consequently, the fluorescent effect will have a length of life which is equal to the length of useful life of the glass spheres. As the glass spheres become worn due to contact with vehicle wheels, new glass material will constantly be exposed.

According to a preferred embodiment the glass is transparent to both visible light and ultraviolet light.

The aforesaid binder 3 can be any binder suitable for the purpose intended, such as a polymer. The binder shall be relatively durable and shall be well capable of retaining those glass spheres which are located at the surface of the coating when said surface is subjected to the wear and tear of vehicle wheels.

One suitable binder in this regard is a thermoplastic mass or compound, for instance an alkyd resin. The binder may incorporate a filler, which may be crushed glass. The binder will preferably be transparent to ultraviolet light. This provides a better fluorescence effect for all embodiments of the invention in comparison with a binder which is not transparent to ultraviolet light.

According to a first embodiment of the invention, the material incorporating pigment for emitting coloured light when illuminated with light within the visible wavelength range consists of glass spheres 4 or glass pieces produced from coloured glass and admixed with the binder 3. Such coloured glass spheres are shown by solid circles in FIG. 1. The term glass pieces also includes crushed or disintegrated glass.

According to one alternative of admixing glass spheres made of coloured glass, said material having a pigment for emitting a colour when illuminated with light within the visible wavelength range comprises colour pigment which is applied to the outer surfaces of glass spheres or glass pieces admixed with the binding agent.

The binder 3 is transparent to visible light in both of these embodiments.

These embodiments provide good reflection of visible light against the glass spheres. Furthermore, the effect of visible light incident on and reflected by the coating and the effect of ultraviolet light incident on and exciting the doped glass spheres are amplified by the slight penetration of light into the transparent binder 3.

The glass spheres 2, 4 may have a diameter of about 0.1 mm to 5 mm, depending on application. The glass spheres may have mutually the same or different diameters.

The volumetric proportion of the glass spheres in the coating may be varied and optimized with respect to the area of use. It is preferred, however, that the proportion of doped glass spheres and the proportion of coloured glass spheres are approximately the same. In the majority of applications, the total volumetric proportion of glass spheres should be in excess of about 50% and up to a level determined by the mechanical strength of the coating, since an excessively large proportion of glass spheres in comparison with the volumetric proportion of binder will impair the mechanical strength of the coating.

According to a second embodiment of the present invention, said material having pigment for emitting a colour when illuminated with light within the visible wavelength range comprises colour pigment is admixed directly with said binder. The binder 5 of the embodiment illustrated in FIG. 1 is thus coloured. The glass spheres 2 of the FIG. 2 embodiment also consist of doped glass. Transparent and clear glass spheres can be admixed according to this embodiment, for the purpose of increasing the reflectivity of the coating.

The advantage afforded by this embodiment is that the marking can be made more discernible when subjected to visible light, since the whole of the binder is coloured, and the coating is somewhat cheaper to produce than the coating illustrated in FIG. 1. The coating has, however, the drawback that incident ultraviolet light is not able to penetrate the coating to the same extent as is possible with the coating illustrated in FIG. 1. This produces a poorer fluorescence effect.

According to one preferred embodiment of the invention, the glass in the glass spheres or glass pieces which fluoresce when illuminated with ultraviolet light is doped with a dope additive which causes the glass to fluoresce in a yellow colour. The colour pigment intended for visible light is suitably yellow in this case.

According to another preferred embodiment, the glass in the glass spheres or glass pieces which fluoresce when illuminated with ultraviolet light is doped with dope additives which cause the spheres or glass pieces to fluoresce in a white colour. In this case the various glass spheres are doped with different dope additives so as to fluoresce in different colours. According to a further preferred embodiment, the glass spheres or glass pieces are doped so as to emit at least three different fundamental colours which mix to form white light when the glass spheres or glass pieces are illuminated with ultraviolet light.

The colour pigment intended for visible light is preferably white in this case.

According to still another embodiment of the invention a fluorescing pigment is admixed with the binder. These pigments thus act together with the fluorescing glass material. In this case the pigment may, for instance, be zinc oxide or zinc sulphide or zinc sulphite. These pigments have both colour in visible light and the ability to fluoresce. Thus, the colour pigments for visible light can be replaced with a fluorescing pigment.

According to another embodiment, the binder consists of a fluorescing material per se. For instance, the binder may be nylon (registered trademark) or some other polymer which fluoresces. The fluorescing glass material is present in such cases, however.

The coating 1 may have any suitable thickness, depending on the purpose for which it is used. In the case of road markings, the coating 1 will suitably have a thickness corresponding to that of conventional road markings, i.e. a thickness for instance of 2-5 mm, preferably 3 mm.

Various embodiments of the invention have been described in the aforegoing. It will be understood, however, that further modifications can be made with respect to the proportion in which the glass spheres are present, and also to the choice of binder etc., without departing from the inventive concept.

The invention shall not therefore be considered limited to the aforedescribed embodiments, since variations can be made within the scope of the following claims.

We claim:

1. A coating which emits a color when illuminated with light within the visible wavelength range and which fluoresces when illuminated with light within the ultraviolet wavelength range, said coating being intended for markings of different kinds and comprising a binder, the binder including a pigment for emitting a color when the binder is illuminated with light within the visible wavelength range, and the binder including glass particles which fluoresce when illuminated with light within the ultraviolet wavelength range, wherein the glass particles have been produced from a glass mass that has been doped with an additive to cause the glass in the glass particles to fluoresce when illuminated with ultraviolet light, so that the fluorescent effect will continue despite wear of the glass particles and will have a length of life which is equal to the length of useful life of the glass particles.

2. A coating according to claim 1, wherein said pigment included in the binder is contained within glass particles produced from colored glass and admixed with the binder.

3. A coating according to claim 1, wherein said pigment included in the binder is a colored pigment applied to glass particles admixed with the binder.

4. A coating according to claim 1, wherein the binder is transparent.

5. A coating according to claim 1, wherein said pigment included in the binder is a colored pigment admixed directly with said binder (3).

6. A coating according to claim 1, wherein said glass particles are doped with an additive which causes the particles to fluoresce in the color yellow.

7. A coating according to claim 1, wherein said glass particles are doped with an additive which causes the particles to fluoresce in the color white.

8. A coating according to claim 1, wherein a fluorescent pigment is admixed with the binder.

9. A coating according to claim 1, wherein said binder is a fluorescing material when subject to ultraviolet light.

10. A coating according to claim 1, wherein said glass in the glass particles is transparent to both visible and ultraviolet light.

11. A coating as defined in claim 1, wherein said glass particles are spheres.

12. A coating as defined in claim 1, wherein said glass particles are pieces of crushed glass.

* * * * *